US006923168B2

(12) United States Patent
Bryde (10) Patent No.: US 6,923,168 B2
(45) Date of Patent: Aug. 2, 2005

(54) FUEL CONTROL SYSTEM AND METHOD FOR DISTRIBUTED POWER GENERATION, CONVERSION, AND STORAGE SYSTEM

(75) Inventor: Jan Henrik Bryde, Drammen (NO)

(73) Assignee: Power-One AS (NO)

( * ) Notice: Subject to any disclaimer, the term of this patent is extended or adjusted under 35 U.S.C. 154(b) by 2 days.

(21) Appl. No.: 10/754,858

(22) Filed: Jan. 9, 2004

(65) Prior Publication Data

US 2004/0164618 A1 Aug. 26, 2004

Related U.S. Application Data (63) Continuation-in-part of application No. 10/361,400, filed on Feb. 10, 2003.

(51) Int. Cl.[7] ................................................. F02N 11/14
(52) U.S. Cl. .................................... 123/576; 123/179.16
(58) Field of Search ................................ 123/575, 576, 123/577, 179.16, 3; 307/64

(56) References Cited

U.S. PATENT DOCUMENTS

| | | | | |
|---|---|---|---|---|
| 4,411,223 A | * | 10/1983 | Kiely | 123/3 |
| 4,712,516 A | * | 12/1987 | Eberhardt | 123/1 A |
| 5,754,033 A | * | 5/1998 | Thomson | 322/45 |

* cited by examiner

Primary Examiner—Willis R. Wolfe
Assistant Examiner—Arnold Castro
(74) Attorney, Agent, or Firm—O'Melveny & Myers LLP (57) ABSTRACT

A distributed power generating system enables very rapid and reliable start-up of an engine used to generate back-up power, thereby substantially reducing the need for stored power. More particularly, the distributed power generating system comprises a power bus electrically coupled to commercial power and to a load, an engine comprising a rotatable shaft, a starter/generator operatively coupled to the shaft of the engine and electrically coupled to the power bus, and a temporary storage device electrically coupled to the power bus. The starter/generator is adapted to start the engine from a standstill condition and rapidly bring the engine to an operational speed sustainable by the engine alone. In an embodiment of the invention, the power generating system further includes a plurality of redundant fuel tanks each containing liquid fuel, such as propane, at a respective initial pressure level. A fuel delivery system operatively couples a selected one of the plurality of fuel tanks to the engine to supply fuel thereto. The fuel delivery system supplies vaporized fuel to the engine at a first reduced pressure level relative to the initial pressure level of the selected one of the plurality of fuel tanks while the starter/generator is starting the engine from the standstill condition, and supplies vaporized fuel to the engine at a second reduced pressure level lower than the first reduced pressure level when the engine reaches the operational speed. By supplying fuel to the engine at the first reduced pressure level, the fuel is delivered rapidly to the engine in order to promote fast startup from the standstill condition.

36 Claims, 7 Drawing Sheets

FUEL CONTROL SYSTEM AND METHOD FOR DISTRIBUTED POWER GENERATION, CONVERSION, AND STORAGE SYSTEM

RELATED APPLICATION DATA

This is a continuation-in-part of copending patent application Ser. No. 10/361,400, for DISTRIBUTED POWER GENERATION, CONVERSION, AND STORAGE SYSTEM, filed Feb. 10, 2003.

BACKGROUND OF THE INVENTION

1. Field of the Invention

The present invention pertains to the generation of electrical power. In particular, this invention relates to distributed power generation systems for use close to where electricity is used (e.g., a home or business) to provide an alternative to or an enhancement of the traditional electric power system.

2. Description of Related Art

Centralized electric power generating plants provide the primary source of electric power supply for most commercial, agricultural and residential customers throughout the world. These centralized power-generating plants typically utilize an electrical generator to produce electrical power. The generator has an armature that is driven by conversion of an energy source to kinetic energy, such as a water wheel in a hydroelectric dam, a diesel engine or a gas turbine. In most cases, steam is used to turn the armature, and the steam is created either by burning fossil fuels (e.g., oil, coal, natural gas, etc.) or through nuclear reaction. The generated electrical power is then delivered over a grid to customers that may be located great distances from the power generating plants. Due to the high cost of building and operating electric power generating plants and their associated power grid, most electrical power is produced by large electric utilities that control distribution for defined geographical areas.

In recent years, however, there has been a trend away from the centralized model of electric power generation toward a distributed power generation model. One reason for this trend is the inadequacy of the existing electric power infrastructure to keep pace with soaring demand for high-quality, reliable power. Electric power distributed in the traditional, centralized manner tends to experience undesirable frequency variations, voltage transients, surges, dips or other disruptions due to changing load conditions, faulty or aging equipment, and other environmental factors. This electric power is inadequate for many customers that require a premium source of power (high quality) due to the sensitivity of their equipment (e.g., computing or telecommunications providers) or that require high reliability without disruption (e.g., hospitals). The utilities that traditionally operate centralized power generating plants are increasingly reluctant to make the large investments in modernized facilities and distribution equipment needed to improve the quality and reliability of their electric power due to regulatory, environmental, and political considerations.

More recently, technological advancements in small-scale power generating equipment has led to greater efficiencies, environmental advantages, and lower costs for distributed power generation. Various technologies are available for distributed power generation, including turbine generators, internal combustion engine/generators, microturbines, photovoltaic/solar panels, wind turbines, and fuel cells. Distributed power generating systems can complement centralized power generation by providing incremental capacity to the utility grid or to an end user. By installing a distributed power generating system at or near the end user, the electric utility can also benefit by avoiding or reducing the cost of transmission and distribution system upgrades. For the end user, the potential lower cost, higher service reliability, high power quality, increased energy efficiency, and energy independence are all reasons for interest in distributed power generating systems.

There are numerous applications for distributed power generating systems. A primary application is to produce premium electric power having reduced frequency variations, voltage transients, surges, dips or other disruptions. Another application is to provide standby power (also known as an uninterruptible power supply or UPS) used in the event of a power outage from the electric grid. Distributed power generating systems can also provide peak shaving, i.e., the use of distributed power during times when electric use and demand charges are high. In such cases, distributed power can be used as baseload or primary power when it is less expensive to produce locally than to purchase from the electric utility. By using the waste heat for existing thermal processes, known as co-generation, the end user can further increase the efficiency of distributed power generation.

Notwithstanding these and other advantages of distributed power generation, there are other disadvantages that must be overcome to achieve wider acceptance of the technology. Conventional distributed power generating systems require further improvements in reliability and efficiency in order to compete effectively with centralized power generation. Distributed power generating systems that utilize an engine to drive a generator tend to be slow to achieve an operational speed from start up, and consequently are slow to provide a source of back-up power. During the time necessary to bring the engine and generator up to operational speed, the distributed power generating system must rely on stored power (i.e., batteries) to supply the back-up source. Battery storage systems are large, expensive, heavy, and have relatively short life expectancy. It is therefore desirable to minimize reliance of the distributed power generating system on batteries.

Accordingly, it would be desirable to provide a distributed power generating system to serve as an alternative to or enhancement of centralized power generation that overcomes these and other drawbacks of conventional distributed power generation. More particularly, it would be desirable to provide a distributed power generating system that achieves an operational state very rapidly so as to reduce the reliance on stored power.

SUMMARY OF THE INVENTION

The present invention is directed to a fuel delivery system for a distributed power generating system that enables very rapid and reliable start-up of the engine used to generate back-up power, thereby substantially reducing the need for stored power. The fuel delivery system rapidly delivers fuel to the engine in order to promote rapid start of the engine.

The distributed power generating system comprises a power bus electrically coupled to commercial power and to a load, an engine comprising a rotatable shaft, a starter/generator operatively coupled to the shaft of the engine and electrically coupled to the power bus, and a temporary storage device electrically coupled to the power bus. The starter/generator is adapted to start the engine from a standstill condition and rapidly brings the engine to an operational speed sustainable by the engine alone. To accomplish this, the starter/generator has a short time torque capability higher than the rated torque of the engine and starter/generator. When the engine reaches the operational speed, the starter/generator delivers electrical power to the power bus. Upon a fault of the commercial power, the temporary storage device supplies electrical power to the power bus for delivery to the load and for powering the starter/generator until the engine reaches the operational speed, whereupon the starter/generator takes over supply of electrical power to the power bus for delivery to the load. The temporary storage device may further comprise at least one capacitor that is charged by current on the power bus when the engine reaches the operational speed.

In an embodiment of the invention, the power generating system further includes a plurality of redundant fuel tanks each containing liquid fuel, such as propane, at a respective initial pressure level. A fuel delivery system operatively couples a selected one of the plurality of fuel tanks to the engine to supply fuel thereto. The fuel delivery system supplies vaporized fuel to the engine at a first reduced pressure level relative to the initial pressure level of the selected one of the plurality of fuel tanks while the starter/generator is starting the engine from the standstill condition, and supplies vaporized fuel to the engine at a second reduced pressure level lower than the first reduced pressure level when the engine reaches the operational speed. By supplying fuel to the engine at the first reduced pressure level, the fuel is delivered rapidly to the engine in order to promote fast startup from the standstill condition.

More specifically, a manually operative tank cutoff valve is coupled between each respective one of the plurality of fuel tanks and the fuel delivery system. An automatically operative main cutoff valve is disposed close to the engine so as to maintain a supply of vaporized fuel close to the engine and avoid the re-pressurization of the main fuel line upon subsequent start up of the engine. An automatically operative tank cutoff valve is disposed upstream from each respective one of the plurality of fuel tanks. A first regulator reduces the fuel pressure from the selected one of the plurality of fuel tanks to the first reduced pressure level. A second regulator reduces the fuel pressure from the first reduced pressure level to the second reduced pressure level. A bypass valve couples the first regulator directly to the engine and is selectively activated while the starter/generator is starting the engine from the standstill condition. In a further embodiment of the invention, a secondary fuel source is coupled to the fuel delivery system for supply of a secondary fuel to the engine, such as compressed natural gas.

A more complete understanding of the fuel delivery system for a distributed power generating system will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention satisfies the need for a distributed power generating system to serve as an alternative to or enhancement of centralized power generation. Specifically, the present invention provides a distributed power generating system that achieves an operational state very rapidly so as to reduce the reliance on stored power. According to a particular embodiment of the invention, a fuel control system is provided that quickly delivers fuel to the combustion engine used to generate power, to thereby facilitate fast achievement of the desired operational state. In the detailed description that follows, like element numerals are used to describe like elements illustrated in one or more of the figures.

Figure 1:
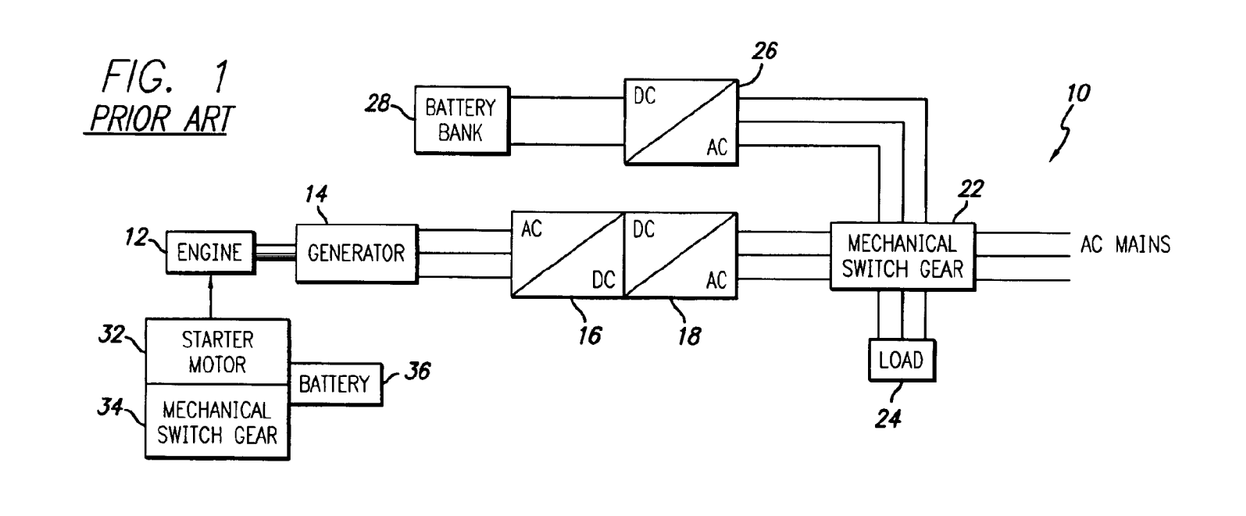
FIG. 1 is a block diagram of a conventional distributed power generating system.

FIG. 1 illustrates a block diagram of a conventional distributed power generating system 10. The distributed power generating system 10 includes switchgear 22 that enables the coupling of AC power to a load 24 from a variety of sources. Under normal conditions, AC power is delivered to the load 24 through the switchgear 22 from the AC power mains connected to the commercial power grid. In the event of a fault of the AC mains, the switchgear 22 cuts off the AC mains and delivers AC power to the load from either a generator 14 or a battery bank 28. The switchgear 22 can also supply the AC output of the generator 14 back to the power grid. The switchgear 22 may comprise a mechanical switch that is manually actuated by an operator or may be adapted to automatically actuate the switch upon detection of a fault.

The power generating system 10 further includes an engine 12 that drives the generator 14. The engine 12 may comprise a reciprocating engine using a combustible fuel such as diesel, gasoline, and the like. The generator 14 converts the rotational energy of a rotor shaft driven by the engine 12 into AC power. The generator 14 is electrically connected to a rectifier 16 that converts the AC power into DC. The rectifier 16 is further electrically coupled to an inverter 18 that converts the DC power back into an AC output, such as a high voltage, three-phase AC output (e.g., 400/480 volts AC), that is delivered to the load 24 through the switchgear 22. Alternatively, the generator 14 may deliver AC power directly to the switchgear 22 without the intervening rectifier 16 and inverter 18, but it is advantageous to include the rectifier 16 and inverter 18 in order to regulate the frequency, phase and/or amplitude of the AC power delivered to the load 24.

A starter motor 32 connected to the engine 12 by an associated mechanical linkage 34 is used to start the engine 12 from a cold condition. The mechanical linkage 34 enables the starter motor 32 to be disengaged from the engine 12 once the engine has started. A battery 36 provides DC power to the starter motor 32. The battery bank 28 comprises a plurality of batteries (e.g., lead-acid batteries) that are coupled together in parallel to provide a source of DC power. The DC power is converted to AC power by inverter 26, which is in turn delivered to the switchgear 22 for delivery to the load 24. Rectified AC passing through the switchgear 22 from either the generator 14 or the AC mains may be used to charge the battery bank 28.

Upon the detection of a fault with the AC mains, the distributed power generating system 10 goes into the back up mode. The switchgear 22 first connects the battery bank 28 to the load 24 as discussed above to continue to supply AC power to the load. Meanwhile, the engine 12 is started by operation of the starter motor 32. Particularly, the starter motor 32 turns the shaft of the engine 12 at a minimal rate sufficient to begin a reciprocating cycle of the engine 12 (e.g., 500 rpm). When fuel within the cylinders of the engine 12 begins to ignite and the shaft of the engine is able to turn on its own, the starter motor 32 disengages from the engine 12. Eventually, the engine 12 reaches an operational speed (e.g., 3,000 rpm) and the generator 14 begins producing reliable AC power. The switchgear 22 then disconnects the battery bank 28 from the load 24 and connects the generator 14 to the load 24.

As discussed above, there are a number of significant drawbacks with the conventional distributed power generating system 10. First, there are a high number of components, including various mechanical components that are subject to failure. The mechanical switchgear 22 represents a particularly critical component, the failure of which can totally disable the power generating system 10 and further cause the failure of other system components. The mechanical linkage 34 also represents a critical failure point, since the engine 12 cannot be started if there is a failure of the linkage. Second, the engine 12 has a relatively long start-up time due to the use of a small capacity starter motor 32. Since the starter motor 32 is only used to turn over the engine 12 at a minimal rate sufficient to initiate internal combustion, it is known to use a low torque starter motor. If the engine 12 has been sitting idle for a while, it may take several seconds for the engine 12 to start. The battery bank 26 must therefore have sufficient capacity (and hence size) to supply the load 24 during the relatively long start-up time of the engine 12. Batteries have relatively limited life expectancies (e.g., approximately five years) and require routine maintenance to keep them in serviceable condition. Moreover, the battery bank 26 is used only for supplying the load 24 and not for powering the starter motor 32. The separate battery 36 used to power the starter motor 32 is susceptible to discharge, representing yet another critical failure point of the system 10.

The present invention overcomes these and other drawbacks of conventional distributed power generating systems. Particularly, the present invention enables very rapid and reliable start-up of the engine used to generate back-up power, thereby eliminating altogether the need for a battery bank. Moreover, the present invention does not include many of the mechanical components of conventional power generating systems, such as the mechanical switchgear, starter motor and associated linkage, which represent significant failure points of the conventional systems. As a result, the present invention provides a highly reliable and cost effective distributed power generating system.

Figure 2:
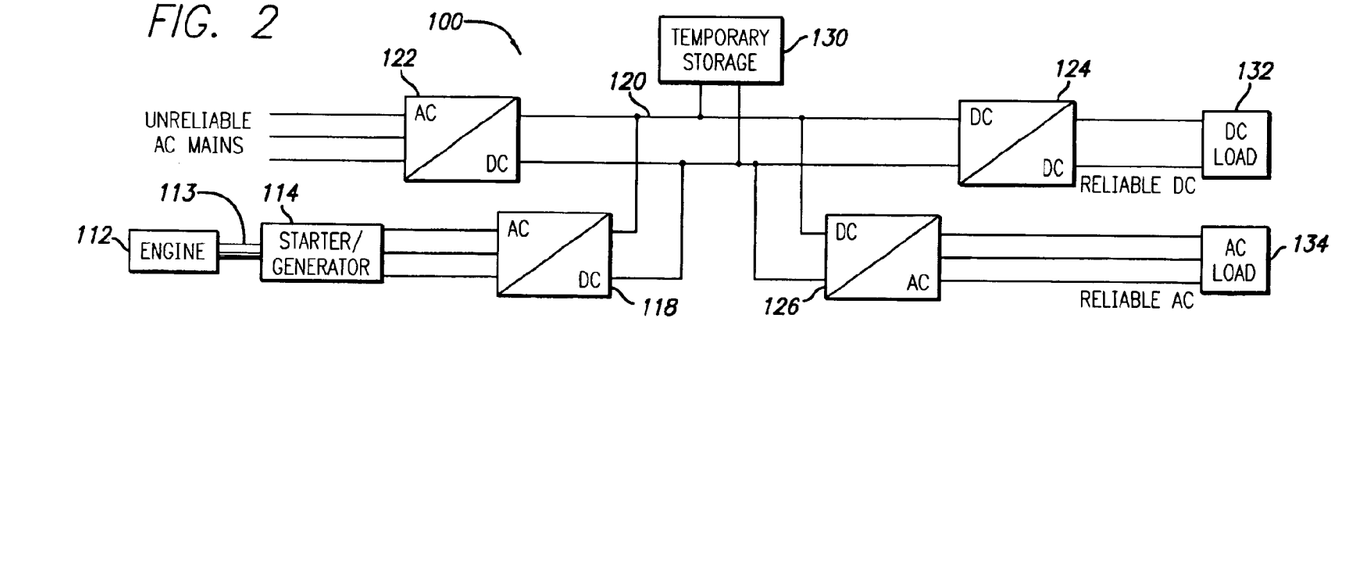
FIG. 2 is a block diagram of a distributed power generating system in accordance with an embodiment of the invention.

Referring now to FIG. 2, a power generating system 100 is illustrated in accordance with an embodiment of the invention. The power generating system 100 includes an engine 112 and a starter/generator 114. The engine 112 may be provided by a reciprocating internal combustion engine, although other types of engines such as turbines could also be advantageously utilized. The engine 112 is powered using a fuel such as propane, compressed natural gas, diesel or gasoline. The engine 112 drives a rotatable shaft 113 that is operatively coupled to the starter/generator 114. Unlike the conventional systems, the starter/generator 114 provides the dual functions of starting the engine 112 from a standstill condition and producing electrical power after the engine 112 reaches an optimum operational speed, thereby eliminating the need for a separate starter motor, linkage or battery.

Further, the present power generating system 100 avoids the use of mechanical switchgear by including a common DC power bus 120. DC power is supplied to the DC power bus 120 by the AC mains, the starter/generator 114, and a temporary storage 130. Rectifier 122 is electrically connected to the AC mains and delivers rectified DC power onto the common DC power bus 120. The starter/generator 114 is electrically connected to rectifier 118 that converts AC power produced by the starter/generator 114 into DC power that is provided to the common DC power bus 120. The temporary storage 130 provides short term or transient power. In an embodiment of the invention, the temporary storage 130 comprises one or more electrolytic capacitors that are charged by the DC power on the common DC power bus 120 and deliver DC power to the bus during transient load conditions. The temporary storage 130 also provides power to the starter/generator 114 through the DC power bus 120 and rectifier 118 to power the starter/generator 114 during start-up of the engine 112. Alternatively, the temporary storage 130 may be provided by other known sources, such as flywheels, batteries, fuel cells, and the like.

The DC power of the common power bus 120 is delivered to a load through the DC-to-DC converter 124 and the inverter 126. The DC-to-DC converter 124 converts the DC power from the common power bus 120 into a different voltage DC output (e.g., 48 volts DC) used to supply a DC load 132. The inverter 126 converts the DC power from the common power bus 120 into an AC output, such as a reliable high voltage, three-phase AC output (e.g., 400/480 volts AC), used to supply an AC load 134. It should be understood that the AC output of the inverter 126 and the DC output of the converter 124 represent premium electric power that is substantially free of undesirable frequency variations, voltage transients, surges, dips or other disruptions.

Figure 3A:
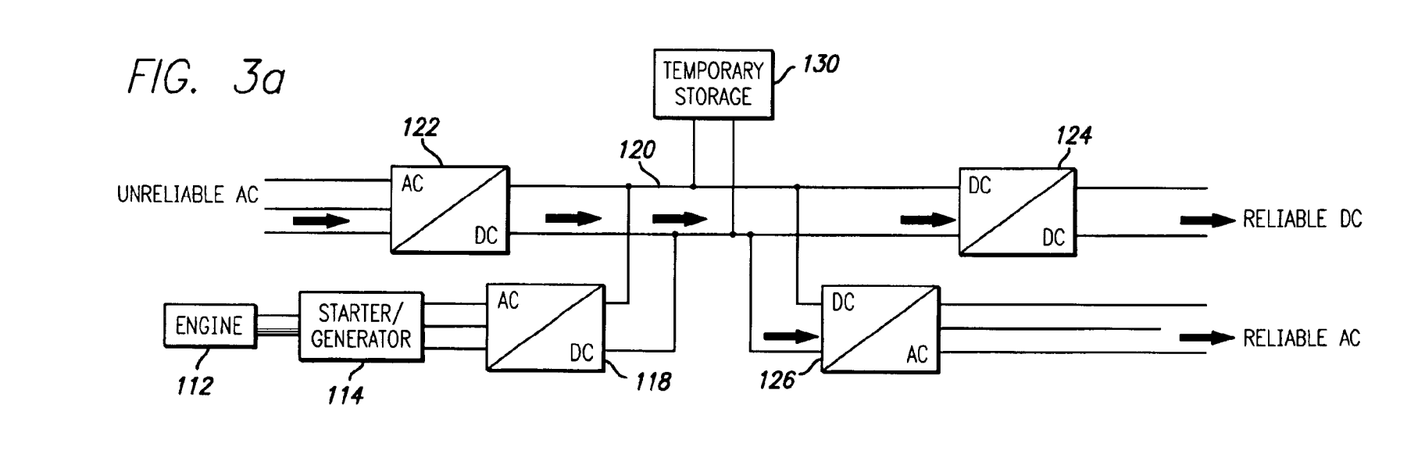
FIG. 3a is a block diagram showing the flow of power in the distributed power generating system prior to start up.

FIG. 3a illustrates normal operation of the distributed power generating system 100 with the AC mains supplying the common DC power bus 120 through rectifier 122. The temporary storage 130 is charged by the rectified DC power on the power bus 120. The DC power of the common power bus 120 is delivered to a load through the DC-to-DC converter 124 and inverter 126 as discussed above. The engine 112 and starter/generator 114 are not operating at this time.

Figure 3B:
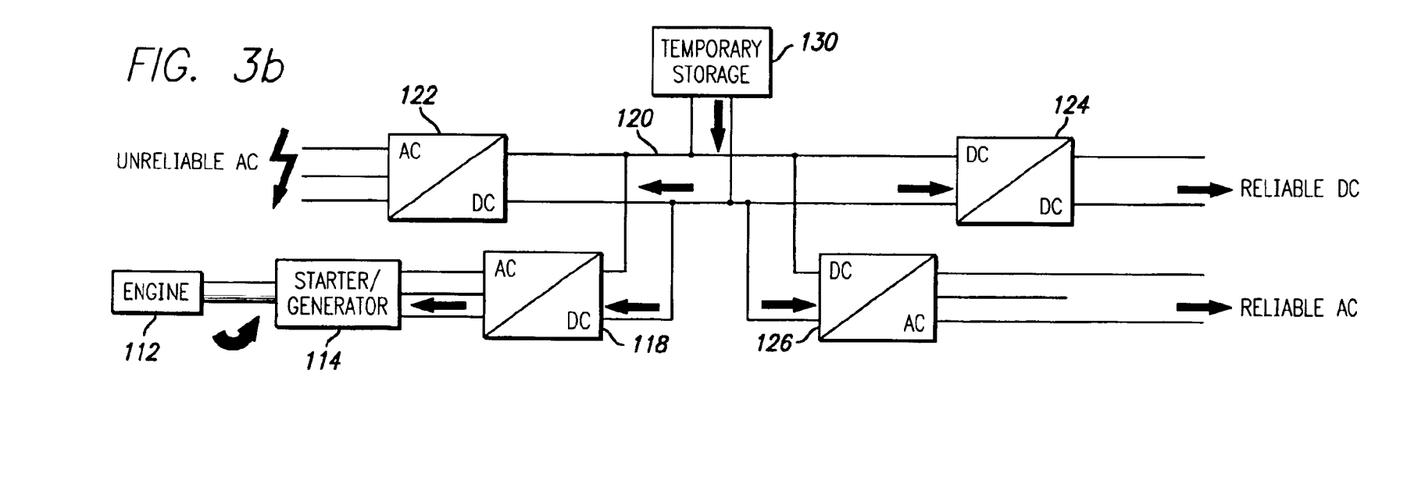
FIG. 3b is a block diagram showing the flow of power in the distributed power generating system during a first interval following start up.
Figure 3C:
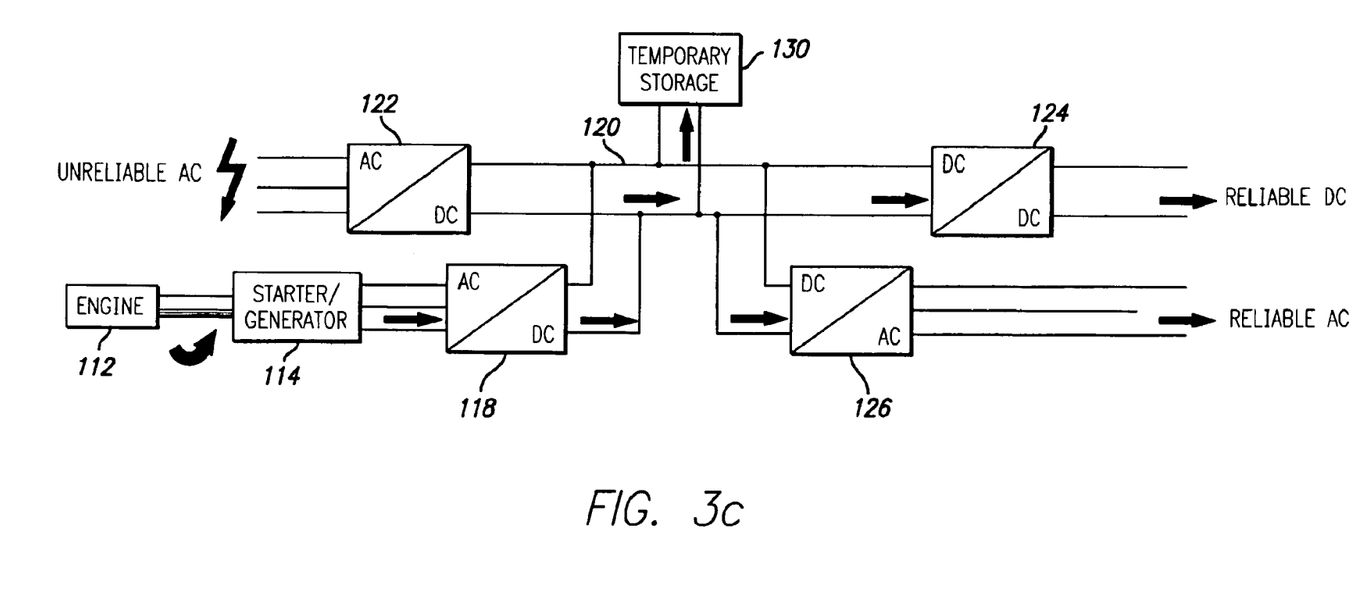
FIG. 3c is a block diagram showing the flow of power in the distributed power generating system during a second interval following start up.

FIG. 3b illustrates a condition of the distributed power generating system 100 in a first interval following failure of the AC mains. The temporary storage 130 provides DC power to the starter/generator 113, which commences rotating the rotor shaft of the engine 112. The temporary storage 130 also supplies power to the common DC power bus 120 for delivery to a load through the DC-to-DC converter 124 and inverter 126 as discussed above. FIG. 3c illustrates a condition of the distributed generating system 100 in a second interval following failure of the AC mains. The engine 112 has started and reached an operational speed. The direction of current in the starter/generator 113 reverses, and the starter/generator now supplies power to the common DC power bus 120 for delivery to a load through the DC-to-DC converter 124 and inverter 126 and to recharge the temporary storage 130. This condition will continue until such time as the AC mains have recovered from the fault.

It should be appreciated that the distributed power generating system must strike a balance between the size/capacity of the temporary storage 130, the power drawn by the starter/generator 114, and the start-up time of the engine 112. It is desirable to limit the size of the temporary storage 130 to the minimum necessary to supply the load and the starter/generator 114 for the time needed to bring the engine 112 up to operational speed. If the engine 112 were brought up to speed too slowly, the temporary storage 130 would have to supply the load for a longer period of time and would hence require greater size and capacity. At the same time, if the power rating of the starter/generator 114 is not properly matched to the engine 112, the starter/generator would draw excessive power from the temporary storage 130 without appreciably decreasing the time for the engine 112 to be brought to operational speed.

In the present invention, an optimal balance between these parameters is met with the starter/generator 114 selected to have a short time torque capability higher than the rated torque of the engine 112 and starter/generator 114, so that the starter/generator 114 can bring the engine 112 quickly to full operation with respect to ignition, speed and torque. The fraction of the short time torque capability of the starter/generator 114 compared to the moment of inertia of the rotating part of the engine 112 can be optimized to achieve an acceleration time from zero to rated speed within less than a second, and more particularly within less than 0.2 second. In an exemplary embodiment of the invention, the starter/generator 114 has a short time torque capability at least two times higher than the rated torque of the engine 112 and starter/generator 114. In yet another exemplary embodiment of the invention, the starter/generator 114 has a short time torque capability at least four times higher than the rated torque of the engine 112 and starter/generator 114. Due to a typically lower short time torque capability (roughly 1/10 of the rated torque of the engine 112 and starter/generator 114) and higher moment of inertia, conventional systems result in substantially longer start-up times.

Figure 4:
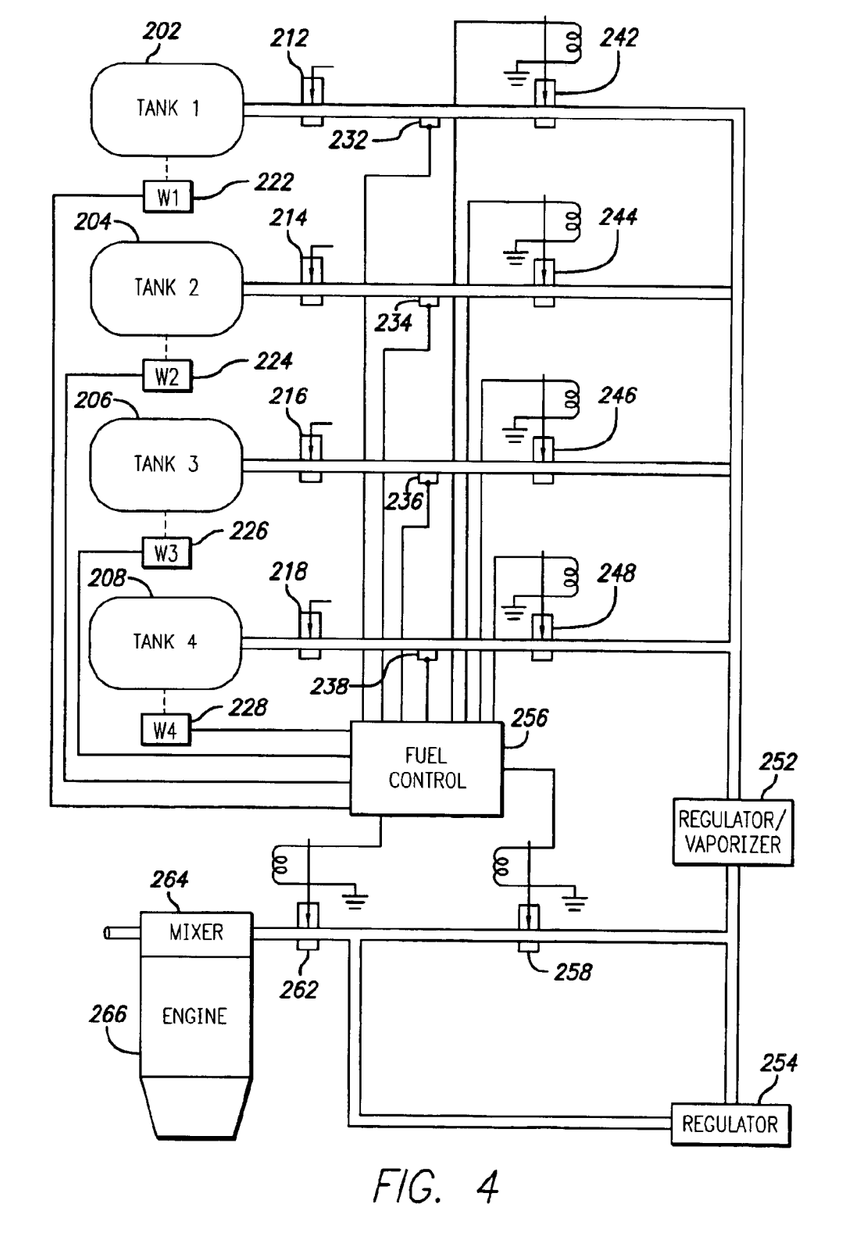
FIG. 4 is a block diagram of an embodiment of a fuel delivery system for the distributed power generating system.

Referring now to FIG. 4, an embodiment of a fuel delivery system for the distributed power generating system is shown. The fuel delivery system provides a supply of vaporized fuel to an internal combustion engine 266, which in turn drives a generator as substantially described above. The engine 266 includes a mixer 264 that meters the flow of vaporized fuel with air at a suitable mixture ratio in accordance with the requirements of the engine 266. As will be further described below, the fuel delivery system facilitates rapid start of the engine 266 by delivering the vaporized fuel at a positive pressure level. Once the engine 266 has started, the pressure level of the vaporized fuel is reduced to a normal operating level.

The fuel delivery system includes a plurality of redundant fuel tanks 202, 204, 206, 208 that are each adapted to hold a supply of liquefied petroleum gas fuel for the engine. In a preferred embodiment of the invention, the liquefied petroleum gas is propane, although it should be appreciated that natural gas and other generally equivalent gaseous fuels could be advantageously utilized. Propane is advantageous as a fuel source for distributed power applications because it is easily and safely stored and transported in liquid form, and has an extremely low boiling point (−43.76° F.) that allows it to vaporize to a gaseous state for combustion at a low temperature. The fuel tanks 202, 204, 206, 208 may further comprise bottles having a suitable size to permit replacement as the fuel supply is spent. Each fuel tank 202, 204, 206, 208 has a corresponding manual cutoff valve 212, 214, 216, 218 that couples the tank to the engine 266 through associated plumbing (described below). When one of the fuel tanks has become spent, the corresponding manual cutoff valve is closed to facilitate removal of the tank from the fuel delivery system. Then, after a replacement fuel tank has been installed, the corresponding manual cutoff valve is opened to permit the tank to communicate with the fuel delivery system. As will be further described below, only one of the fuel tanks 202, 204, 206, 208 will be providing fuel to the engine 266 at a given time. While FIG. 4 illustrates an exemplary fuel delivery system having four fuel tanks, it should be appreciated that a greater or lesser number of fuel tanks could also be advantageously utilized depending upon the operational requirements of a particular distributed power generation system.

The fuel delivery system further includes a first regulator/vaporizer 252 and a second regulator 254. The first regulator/vaporizer 252 receives pressurized liquid fuel from the operative fuel tank, and changes the liquid fuel to a gaseous state. Vaporization of the propane fuel from the liquid to gas phase takes place by a drop in pressure and/or application of heat. The first regulator/vaporizer 252 drops the pressure of the liquid fuel from roughly 6 bar (i.e., 87 psi) to a first reduced pressure level of roughly 35 millibar (i.e., 0.50 psi). The second regulator 254 drops the pressure of the vaporized fuel from the first reduced pressure level to a second reduced pressure level of roughly −0.125 millibar (i.e., −0.002 psi). As shown in FIG. 4, a main fuel line is coupled from the second regulator 254 to the mixer 264 and a bypass fuel line is coupled from the first regulator/vaporizer 252 to the mixer 264 (i.e., bypassing the second regulator 254). The bypass fuel line will be used to supply vaporized fuel at the first reduced pressure level during startup of the engine 266 and the main fuel line will be used to supply vaporized fuel at the second reduced pressure level during steady state operation of the engine.

Ordinarily, when the engine 266 is running at a steady state, the engine produces sufficient suction pressure to draw the vaporized fuel through the main fuel line from the second regulator 254 at the second reduced pressure level. But, when the engine 266 is not yet running, there is no suction pressure to draw the vaporized fuel into the mixer 264. As the engine 266 is started by operation of the starter/generator (discussed above), the suction pressure gradually increases until it is sufficient to draw the vaporized fuel. A drawback of this operation is that it takes time before the suction pressure increases sufficiently for the mixer 264 to receive a quantity of vaporized fuel necessary to promote steady state operation of the engine 266 (i.e., without assistance by the starter/generator). In the present invention, the bypass fuel line is used during the startup phase. With the vaporized fuel at the first reduced pressure level, the vaporized fuel will blow directly into the mixer 264 through the bypass fuel line, without waiting for the engine to develop sufficient suction pressure. Once the engine has started, the bypass fuel line is cut off and vaporized fuel flows normally through the main fuel line.

The fuel delivery system further includes a fuel control unit 256 that operates a plurality of automated valves and sensors to control the flow of vaporized fuel to the engine 266. Each of the automated valves may include a solenoid that can be controlled using electrical signals from the fuel control unit 256. For each fuel tank 202, 204, 206, 208, there is an associated automated cutoff valve 242, 244, 246, 248, pressure sensor 232, 234, 236, 238, and weight sensor 222, 224, 226, 228. The automated cutoff valves 242, 244, 246, 248 are located upstream from the associated manual cutoff valves 212, 214, 216, 218 prior to the first regulator/vaporizer 252. The fuel control unit 256 activates one of the automated cutoff valves 242, 244, 246, 248 at a time to permit a flow of liquid fuel from the associated fuel tank 202, 204, 206, 208 to the first regulator/vaporizer 252. The pressure sensors 232, 234, 236, 238 measure the pressure in the line upstream from the associated manual cutoff valves 212, 214, 216, 218, and provide corresponding signals to the fuel control unit 256. The weight sensors 222, 224, 226, 228 measure the weight of the associated fuel tanks 202, 204, 206, 208, and provide corresponding signals to the fuel control unit 256. The fuel control unit 256 uses the signals from the pressure sensors 232, 234, 236, 238 and the weight sensors 222, 224, 226, 228 to determine which one of the automated cutoff valves 242, 244, 246, 248 to activate.

The fuel control unit 256 also controls two automated valves located upstream from the first regulator/vaporizer 252. A main cutoff valve 262 is located close to the mixer 264 to cut off the supply of vaporized fuel to the engine 266 from either main fuel line or bypass fuel line. By locating the main cutoff valve 262 close to the mixer 264, the fuel delivery system can maintain a supply of vaporized fuel at a desired pressure level very close to the engine 266. This way, the vaporized fuel does not have to travel very far upon startup of the engine 266. The main cutoff valve 262 would be opened during the startup process. Also, a bypass cutoff valve 258 is located in the bypass fuel line between the first regulator/vaporizer 252 and the mixer 264. The bypass cutoff valve 258 is opened during the startup process to permit vaporized fuel at the first reduced pressure level to pass directly to the mixer 264. The bypass cutoff valve 258 is shut off upon reaching steady state operation of the engine 266.

The fuel control unit 256 may further comprise suitable logic circuits and/or firmware adapted to control operation of the automated valves to supply vaporized fuel to the engine 266. For example, the fuel control unit 256 may include a general purpose microprocessor or digital signal processor, application specific integrated circuit (ASIC), field programmable gate array (FPGA), and the like, coupled with suitable memory to store instructions and/or data.

Figure 5:
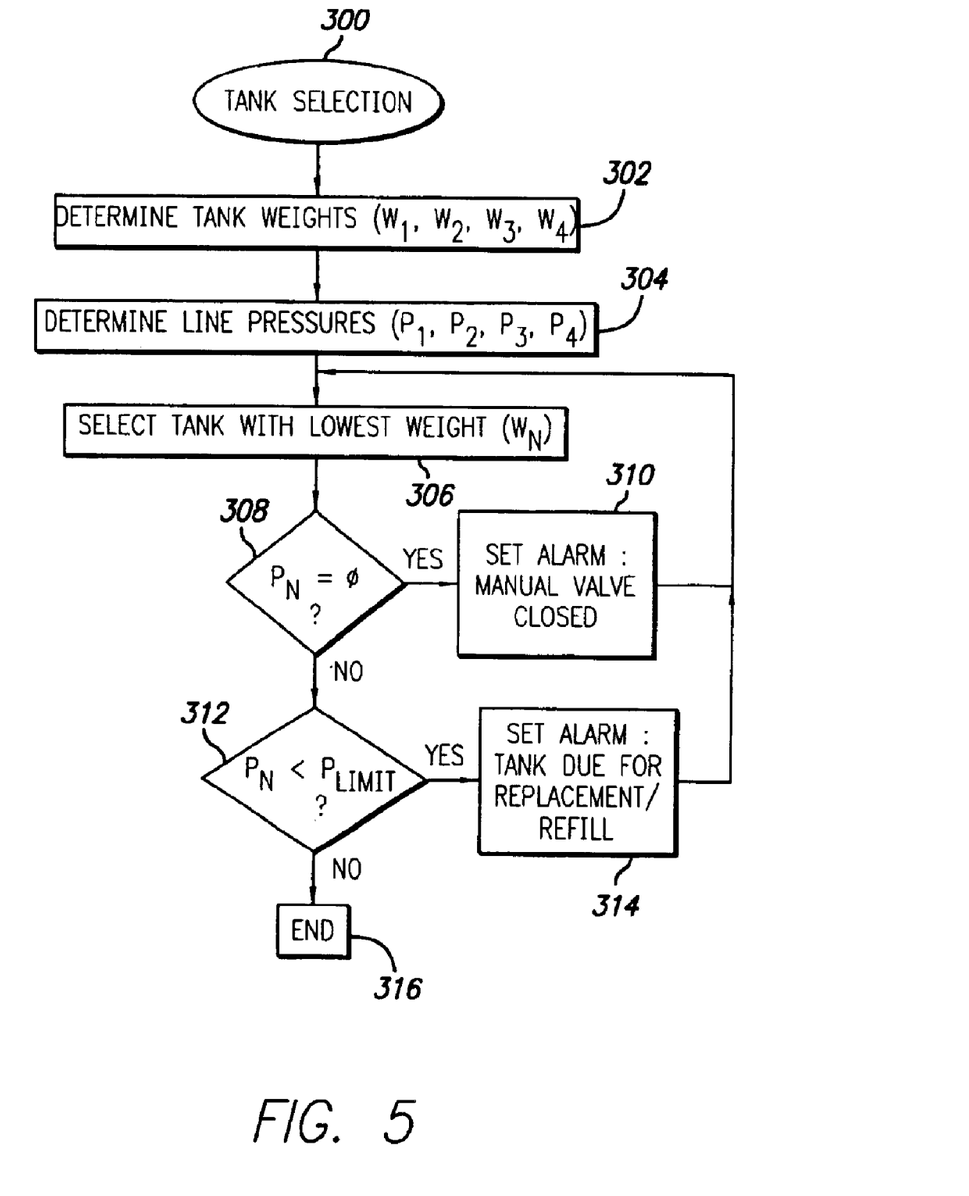
FIG. 5 is a flow diagram showing an exemplary fuel tank selection process of the fuel delivery system.

FIG. 5 illustrates an exemplary process 300 for selecting one of the fuel tanks 202, 204, 206, 208 for delivery of liquid fuel to the fuel delivery system. At step 302, the fuel control unit 256 determines the weights ($w_1$, $w_2$, $w_3$, $w_4$) of the fuel tanks 202, 204, 206, 208 using signals received from the corresponding weight sensors 222, 224, 226, 228. Next, at step 304, the fuel control unit 256 determines the pressure ($p_1$, $p_2$, $p_3$, $p_4$) in the line from the fuel tanks 202, 204, 206, 208 using signals received from the corresponding pressure sensors 212, 214, 216, 218. These pressure and weight measurements may be stored in a memory for later use by the fuel control unit 256. It should be appreciated that the weight measurements of the fuel tanks provides a reasonably accurate prediction of the amount of back up time that the distributed power generation system can provide.

Thereafter, a control loop begins in which the fuel control unit 256 selects one of the fuel tanks based on the weight and pressure measurements. At step 306, the fuel control unit 256 initially selects the tank n with the lowest measured weight ($w_n$), which reflects the lowest volume of liquid fuel. It is desirable that the fuel delivery system use up the remaining fuel in the lightest tank first, so that tank could be replaced. At step 308, the fuel control unit 256 checks whether there is zero pressure from the selected tank n, reflecting that the manual valve from the associated tank is in a closed state. If so, the fuel control unit 256 sets an alarm at step 310 indicating that the manual valve is closed to alert the operator to manually open the manual valve. The control loop then returns to step 306, and the next lightest tank is selected. If the pressure of the selected tank n is not zero, the control loop passes to step 312, in which the pressure of the selected tank n is compared to a threshold limit ($p_{limit}$). If the pressure of the selected tank n is less than the threshold limit ($p_{limit}$), indicating that the fuel level of the tank is below an operational level, the fuel control unit 256 sets an alarm at step 314 indicating that the tank is due for replacement or refill. The control loop then returns to step 306, and the next lightest tank is selected. Alternatively, if the pressure of the selected tank n is equal to or above the threshold limit $p_{limit}$, the selected n is used to supply liquid fuel to the fuel delivery system, and the selection process ends at step 316.

Figure 6:
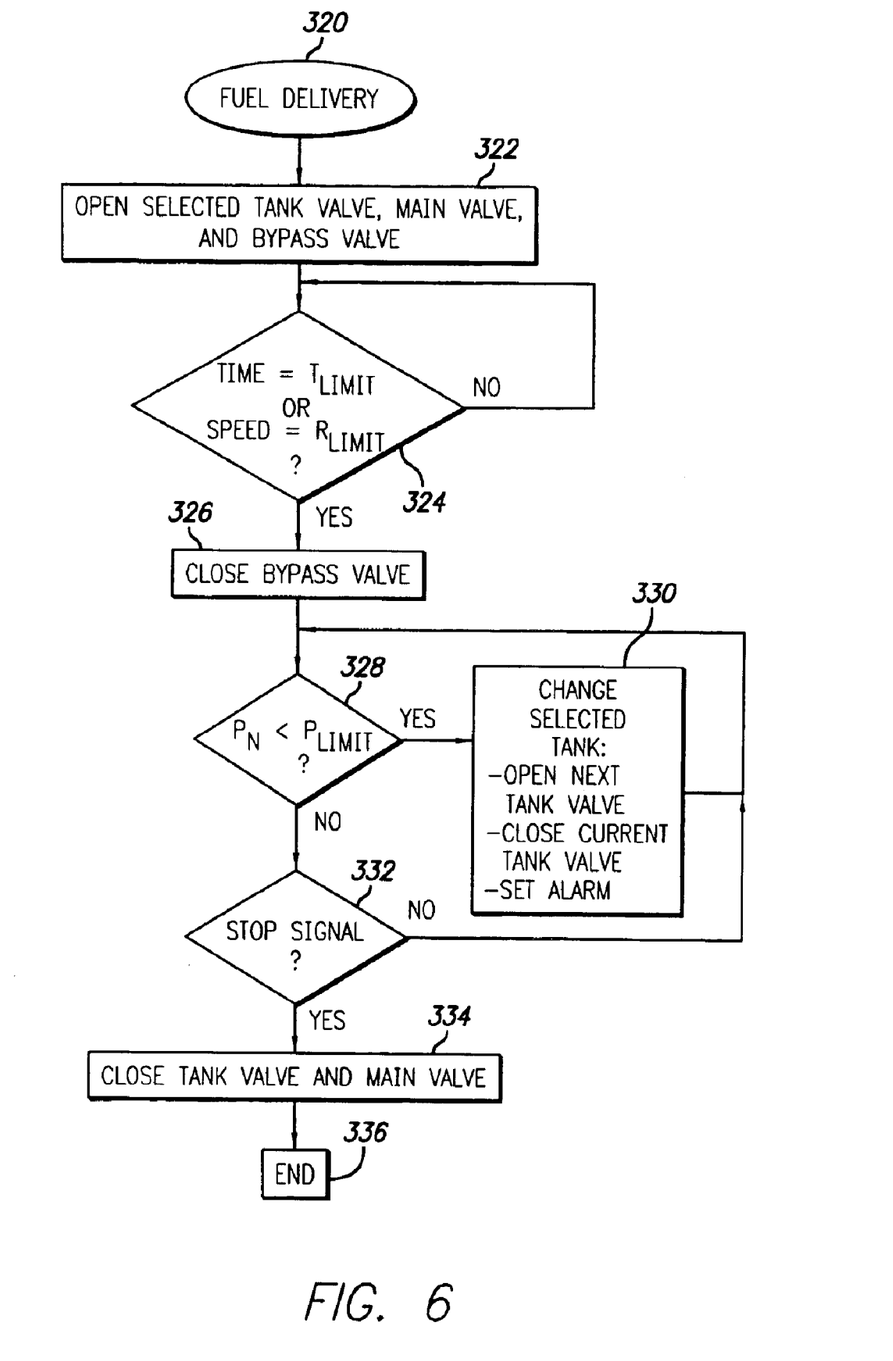
FIG. 6 is a flow diagram showing an exemplary fuel delivery process of the fuel delivery system.

FIG. 6 illustrates an exemplary process 320 for delivering fuel following receipt of a notification to start the engine. At step 322, the fuel control unit 256 simultaneously opens the automated cutoff valve associated with the selected tank n, opens the main cutoff valve 262, and opens the bypass cutoff valve 258. This allows vaporized fuel at the first reduced pressure level to pass to the mixer 264 as discussed above. Then, at step 324, the fuel control unit 256 begins a timer loop that determines whether elapsed time has reached a predetermined limit $t_{limit}$ or whether the engine speed has reached a predetermined speed limit $r_{limit}$. If either of these limits has not yet been reached, the timer loop repeats this step 324. When one of these limits has been reached, indicating that enough time has elapsed for the mixer 264 to be sufficiently primed with vaporized fuel and/or that the engine has reached an optimum speed, the fuel control unit 256 closes the bypass cutoff valve 258 at step 326. The engine 266 continues to operate using vaporized fuel supplied by the main fuel line at the second reduced pressure level.

With the engine running at a steady state, a control loop begins in which the fuel control unit 256 monitors the supply of fuel delivered from the fuel tanks. At step 328, the fuel control unit 256 compares the pressure of the selected tank n to the threshold limit ($p_{limit}$). If the pressure of the selected tank n is less than the threshold limit ($p_{limit}$), indicating that the fuel level of the tank has fallen below an operational level, the fuel control unit 256 will select a new tank in accordance with the process described above with respect to FIG. 5. At step 330, the fuel control unit 256 then opens the automated cutoff valve associated with the newly selected tank, closes the automated cutoff valve associated with the now spent tank, and sets an alarm notifying the user that the spent tank is due for replacement or refill. Alternatively, if the pressure of the selected tank n is equal to or above the threshold limit ($p_{limit}$), indicating that the tank has sufficient fuel remaining, the fuel control unit 256 passes to step 332 and checks for receipt of a notification to stop the engine 266. The stop notification indicates that the engine 266 should be shut down, and may be issued when the need for distributed power has ended or if there is a malfunction with the distributed power generation system. If the stop notification has not yet been received, the fuel control unit 256 returns to step 328 and the control loop repeats. But, if the stop notification has been received, the fuel control unit 256 passes to step 334 and closes the main cutoff valve 262 and the automated cutoff valve associated with the selected tank n. As discussed above, the closing of these valves maintains a supply of vaporized fuel close to the mixer 264, so the fuel delivery system is ready to start the engine 266 again, if needed. The fuel delivery process ends at step 336.

Figure 7:
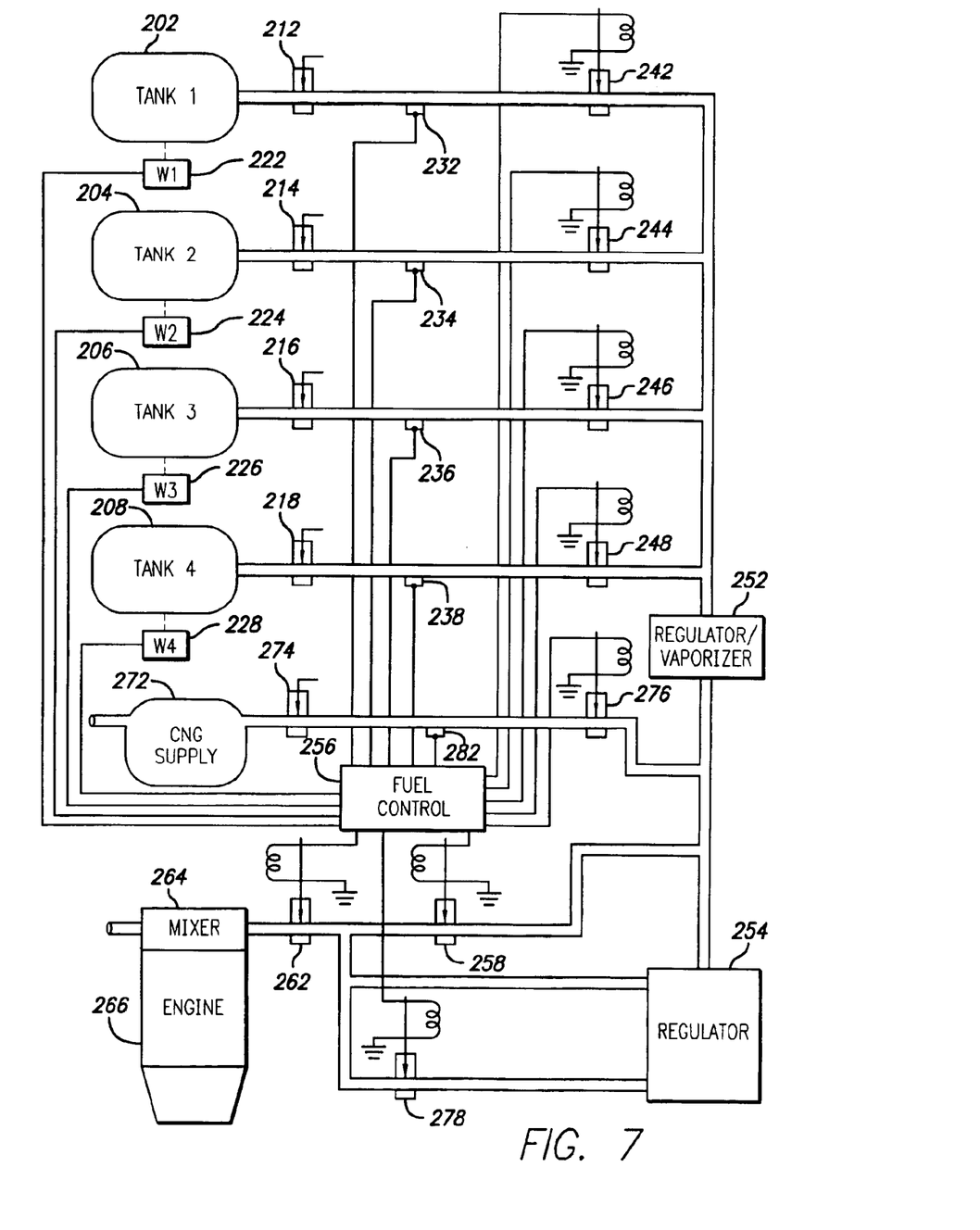
FIG. 7 is a block diagram of an alternative embodiment of a fuel delivery system for the distributed power generating system.

Referring now to FIG. 7, an alternative embodiment of a fuel delivery system for the distributed power generating system is shown. As with the preceding embodiment, the fuel delivery system provides a supply of vaporized fuel to an internal combustion engine 266 of a distributed power generation system. The alternative fuel delivery system is substantially the same as the preceding embodiment, except that it supplements the liquid fuel stored in tanks 202, 204 206, 208 with a supply of compressed natural gas (CNG) delivered from a commercial gas pipeline. As known in the art, natural gas is distributed throughout the United States as well as other countries through extensive pipeline systems that extend from the well-head to the end user. The pipeline systems include long-distance transmissions systems, followed by local distribution systems. Some underground storage is also used to help supply seasonal peak needs. As shown in FIG. 7, a compressed natural gas supply pipeline 272 is coupled to the fuel delivery system. The CNG supply pipeline 272 may include a storage tank located in close proximity to the distributed power generating system.

The CNG supply line 272 has a corresponding manual cutoff valve 274 that couples the tank to the engine 266 through associated plumbing (described below). If it is desired to not rely on commercially supplied CNG, the manual cutoff valve 274 is closed to prevent the introduction of natural gas into the fuel delivery system. As will be further described below, only one of the fuel tanks 202, 204, 206, 208 or the CNG supply line 272 will be providing fuel to the engine 266 at a given time.

The fuel control unit 256 operates additional automated valves and sensors to control the flow of CNG to the engine 266. Automated cutoff valve 276 is located upstream from the manual cutoff valve 274 and couples to the fuel line upstream from the first regulator/vaporizer 252. Since the CNG is already in a gaseous state, it is not necessary to further vaporize the fuel source. Pressure sensor 282 measures the pressure in the line upstream from the manual cutoff valve 274 and provides corresponding signals to the fuel control unit 256. The fuel control unit 256 uses the signal from the pressure sensor 282 to determine whether there is a sufficient supply of CNG provided on the pipeline. Along with the information from the weight and pressure sensors discussed above, the fuel control unit 256 decides which one of the automated cutoff valves 242, 244, 246, 248, and 276 to activate. The second regulator 254 drops the pressure of the CNG to the second reduced pressure level of roughly −0.125 millibar (i.e., −0.002 psi) in the same manner as described above. Depending upon the pressure of the CNG supply pipeline 272, an additional regulator (not shown) may be necessary to step down the pressure before the second regulator 254. The fuel control unit 256 will otherwise operate substantially as described above, with a preference to utilize the CNG supply pipeline 272 as the fuel source instead of the stored liquid fuel when adequate pressure is detected by sensor 282. This way, the stored liquid fuel is conserved for periods in which adequate CNG pressure is unavailable.

As known in the art, CNG has a generally higher energy content per volume than propane. Therefore, the fuel delivery system should be adapted to deliver a higher volume of gas when drawing from the fuel tanks 202, 204, 206, 208 than from the CNG supply pipeline 272. As shown in FIG. 7, the main fuel line from the second regulator 254 to the mixer 264 comprises parallel fuel lines, one of which is controlled by an automated cutoff valve 278. When the fuel delivery system is supplying vaporized fuel from the tanks 202, 204, 206, 208, the automated cutoff valve 278 is opened to increase the flow volume to the mixer 264, i.e., through both parallel fuel lines. Conversely, when the fuel delivery system is supplying CNG to the engine, the automated cutoff valve 278 is shut to restrict the flow volume to the mixer 264, i.e., only through a single fuel line. It should be appreciated that other known systems for restricting volumetric flow to the mixer 264 could also be utilized, such as using variably controlled orifices in the main fuel line.

Having thus described a preferred embodiment of the fuel delivery system for a distributed power generating system, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power generating system, comprising:
   an internal combustion engine;
   a starter/generator operatively coupled to the engine, the starter/generator adapted to start the engine from a standstill condition and bring the engine to an operational speed sustainable by the engine alone whereupon said starter/generator supplies back-up electrical power to a load;
   a plurality of redundant fuel tanks each containing fuel at a respective initial pressure level; and
   a fuel delivery system operatively coupling a selected one of said plurality of fuel tanks to said engine to supply said fuel thereto, said fuel delivery system supplying said fuel to said engine at a first reduced pressure level relative to the initial pressure level of said selected one of said plurality of fuel tanks while said starter/generator is starting said engine from said standstill condition, and supplying said fuel to said engine at a second reduced pressure level lower than said first reduced pressure level when said engine reaches said operational speed;
   wherein, supply of said fuel to said engine at said first reduced pressure level promotes fast start of said engine from said standstill condition.

2. The power generating system of claim 1, further comprising a manually operative tank cutoff valve coupled between each respective one of said plurality of fuel tanks and said fuel delivery system.

3. The power generating system of claim 1, wherein said fuel delivery system further comprises an automatically operative main cutoff valve disposed close to said engine.

4. The power generating system of claim 1, wherein said fuel delivery system further comprises an automatically operative tank cutoff valve disposed upstream from each respective one of said plurality of fuel tanks.

5. The power generating system of claim 1, wherein said fuel delivery system further comprises a first regulator reducing pressure of said fuel from said respective pressure of said selected one of said plurality of fuel tanks to said first reduced pressure level.

6. The power generating system of claim 5, wherein said first regulator further comprises a vaporizer adapted to change said fuel to a gaseous state.

7. The power generating system of claim 5, wherein said fuel delivery system further comprises a second regulator reducing pressure of said fuel from said first reduced pressure level to said second reduced pressure level.

8. The power generating system of claim 7, wherein said fuel delivery system further comprises a bypass valve coupling said first regulator directly to said engine, said bypass valve being selectively activated while said starter/generator is starting said engine from said standstill condition.

9. The power generating system of claim 1, wherein said first reduced pressure level comprises a low positive pressure level.

10. The power generating system of claim 9, wherein said first reduced pressure level comprises approximately 35 millibars.

11. The power generating system of claim 1, wherein said second reduced pressure level comprises a low negative pressure level.

12. The power generating system of claim 11, wherein said second reduced pressure level comprises approximately −0.125 millibars.

13. The power generating system of claim 1, wherein the starter/generator has a short time torque capability higher than a rated torque of said engine.

14. The power generating system of claim 1, wherein said engine reaches the operational speed in less than one second.

15. The power generating system of claim 1, wherein said engine reaches the operational speed in less than 0.2 second.

16. The power generating system of claim 1, wherein said engine further comprises a reciprocating internal combustion engine.

17. The power generating system of claim 1, wherein said fuel further comprises propane.

18. The power generating system of claim 1, further comprising a secondary fuel source coupled to said fuel delivery system for supply of a secondary fuel to said engine.

19. The power generating system of claim 18, wherein said secondary fuel comprises compressed natural gas.

20. The power generating system of claim 18, wherein said secondary fuel source comprises a commercial compressed natural gas pipeline.

21. The power generating system of claim 18, wherein said fuel delivery system further comprises main fuel line providing a first flow rate to said engine that corresponds to energy content of said secondary fuel and a second flow rate to said engine that corresponds to energy content of said fuel from said redundant fuel tanks.

22. The power generating system of claim 1, wherein said plurality of redundant fuel tanks each comprises a weight sensor adapted to determine weight of a corresponding fuel tank.

23. The power generating system of claim 1, wherein said plurality of redundant fuel tanks each comprises a pressure sensor adapted to determine said pressure level of a corresponding fuel tank.

24. A method for operating a power generating system, comprising:
    selecting one of a plurality of fuel tanks for delivery of fuel to an engine;
    upon receipt of an indication to start the engine from a standstill condition, opening a main valve separating said selected fuel tank from said engine, supplying said fuel from said selected fuel tank to said engine at a first pressure level, starting said engine using a starter/generator operatively coupled to the engine, bringing the engine to an operational speed sustainable by the engine alone, and then supplying said fuel to said engine at a second pressure level lower than said first pressure level when said engine reaches said operational speed whereupon said starter/generator supplies back-up electrical power to a load; and
    upon receipt of an indication to stop the engine, closing said main valve.

25. The method of claim 24, wherein said step of rapidly bringing said engine to an operational speed further comprises bringing said engine to said operational speed in less than one second.

26. The method of claim 24, wherein simultaneous with said step of opening said main valve, opening a tank cutoff valve coupled between said selected fuel tank and said engine.

27. The method of claim 26, wherein following opening of said tank cutoff valve and said main valve, vaporizing said fuel to a gaseous state.

28. The method of claim 24, wherein supplying said fuel from said selected fuel tank to said engine at said first pressure level further comprises reducing pressure of said fuel from an initial pressure level of said selected fuel tank to said first pressure level.

29. The method of claim 24, wherein supplying said fuel to said engine at said second pressure level further comprises reducing pressure of said fuel from said first pressure level to said second pressure level.

30. The method of claim 24, wherein supplying said fuel to said engine at said second pressure level further comprises opening a bypass valve.

31. The method of claim 24, wherein supplying said fuel from said selected fuel tank to said engine at said first pressure level further comprises supplying said fuel at a low positive pressure level.

32. The method of claim 24, wherein supplying said fuel to said engine at said second pressure level further comprises supplying said fuel at a low negative pressure level.

33. The method of claim 24, further comprising supplying a secondary fuel to said engine.

34. The method of claim 33, further comprising controlling a flow rate of said secondary fuel to said engine that accommodates for energy content of said secondary fuel.

35. The method of claim 24, wherein selecting one of a plurality of fuel tanks further comprises determining weight of each one of said plurality of fuel tanks and selecting one having lowest weight.

36. The method of claim 24, wherein selecting one of a plurality of fuel tanks further comprises determining said initial pressure level of each one of said plurality of fuel tanks.

* * * * *